United States Patent [19]

Miller et al.

[11] 3,925,772

[45] Dec. 9, 1975

[54] A.C. POWER SUPPLY CIRCUIT IN COMBINATION WITH AN A.C. SOURCE AND A D.C. SOURCE

[75] Inventors: Lowell E. Miller, American Fork; Gail R. Nielsen, Salt Lake City, both of Utah

[73] Assignee: Com Tel, Inc., Salt Lake City, Utah

[22] Filed: June 27, 1974

[21] Appl. No.: 483,635

[52] U.S. Cl............. 340/253 C; 307/66; 321/45 R; 331/113 A
[51] Int. Cl.[2]...................... G08B 21/00; H02J 7/00
[58] Field of Search........... 340/253 C, 333; 307/44, 307/45, 46, 48, 64, 66, 80; 315/86; 321/45 R; 331/113 A

[56] References Cited
UNITED STATES PATENTS

| | | | |
|---|---|---|---|
| 3,351,770 | 11/1967 | O'Sullivan et al. | 307/64 |
| 3,771,012 | 11/1973 | Niederjohn | 315/86 |
| 3,833,817 | 9/1974 | Patel | 307/66 |
| 3,836,815 | 9/1974 | Herzog | 307/66 X |

FOREIGN PATENTS OR APPLICATIONS

| | | | |
|---|---|---|---|
| 1,053,481 | 1/1967 | United Kingdom | 307/66 |

Primary Examiner—John W. Caldwell
Assistant Examiner—Daniel Myer
Attorney, Agent, or Firm—Criddle & Thorpe

[57] ABSTRACT

An A.C. power supply circuit for use with an A.C. source and a battery includes a full-wave rectifier for rectifying the A.C. signal produced by the A.C. source, a battery supply control circuit responsive to a control signal for coupling the battery to the output of the rectifier, an A.C. sensing circuit for applying a control signal to the battery supply control circuit if the amplitude of the signal produced by the A.C. source falls below a predetermined level, and an oscillator circuit for producing an oscillatory signal in response to the signal present on the output of the rectifier. A battery sensing circuit is also included for producing a second control signal if the charge on the battery falls below some predetermined level. In response to this second control signal, a battery charge circuit applies a rectified A.C. signal from the A.C. source to the battery. If the charge on the battery falls below a second lower predetermined level, a shutdown circuit applies a signal to the battery supply control circuit to prevent the control circuit from connecting the battery to the output of the rectifier.

22 Claims, 2 Drawing Figures

A.C. POWER SUPPLY CIRCUIT IN COMBINATION WITH AN A.C. SOURCE AND A D.C. SOURCE

BACKGROUND OF THE INVENTION

This invention relates to power supply circuits and more particularly to a power supply circuit for generating an oscillatory output in response to power derived from either an A.C. source, a D.C. source, or both an A.C. source and D.C. source.

Backup power systems are utilized in a variety of situations in which it is deemed essential that no interruption of power occur. Thus, for example, backup power systems are generally always provided for hospitals, computer centers where the interruption of power may result in the loss of valuable information from the computer's memory, telephone systems, etc.

Where backup power systems are provided, it is generally desirable to also provide a control arrangement whereby the power-using equipment will be switched over to the backup system as smoothly as possible upon the occurrence of an interruption of the main power supply. Control arrangements in current use typically provide for switching the power-using equipment completely to the backup system when the power level of the main supply falls below some predetermined level. Thus, the power-using equipment will either be connected to the main power supply or to the backup power system, but not to both. The disadvantage of this arrangement is that the main power supply may still be producing some power even though it falls below the predetermined level, but this power is still not used by the power-using equipment so that the backup system must supply all the needed power.

SUMMARY OF THE INVENTION

It is an object of the present invention to provide a power supply system in combination with a primary A.C. source and a backup D.C. source and in which the power supply system produces a continuous A.C. signal regardless of the output level of the primary A.C. source.

It is also an object of the present invention to provide a simple and yet reliable arrangement for maintaining a continuous A.C. supply even though the primary power supply fails.

It is still another object of the present invention to provide a power supply system which draws power from a backup supply only to the extent the output of a primary supply falls below a predetermined level.

It is a further object of the present invention, in accordance with one aspect thereof, to provide a power supply system which supplies power from a primary A.C. source to replenish a backup D.C. source when the output of the A.C. source is about a predetermined level.

The above and other objects and advantages of the present invention are realized in an illustrative embodiment which includes an A.C. power supply system coupled to an A.C. source and a D.C. source. The system includes a full-wave rectifier for rectifying the A.C. signal produced by the A.C. source, a control circuit responsive to a control signal for coupling the D.C. source to the output of the rectifier, an A.C. sensing circuit coupled to the A.C. source for applying a control signal to the control circuit if the amplitude of the signal produced by the A.C. source falls below a predetermined level, and an oscillator circuit coupled to the rectifier for producing an oscillatory signal in response to the signal present on the output of the rectifier. The signal on the output of the rectifier may be derived either from the A.C. source alone, the D.C. source alone, or both the A.C. source and the D.C. source, depending upon the ouptput level of the A.C. source.

BRIEF DESCRIPTION OF THE DRAWING

The above and other objects, advantages and features of the present invention will become more apparent from the following detailed description presented in connection with the accompanying drawing in which FIGS. 1 and 2, with FIG. 1 positioned to the left of FIG. 2, show one embodiment of a power supply system constructed in accordance with the principles of the present invention.

DETAILED DESCRIPTION

Figure 1:
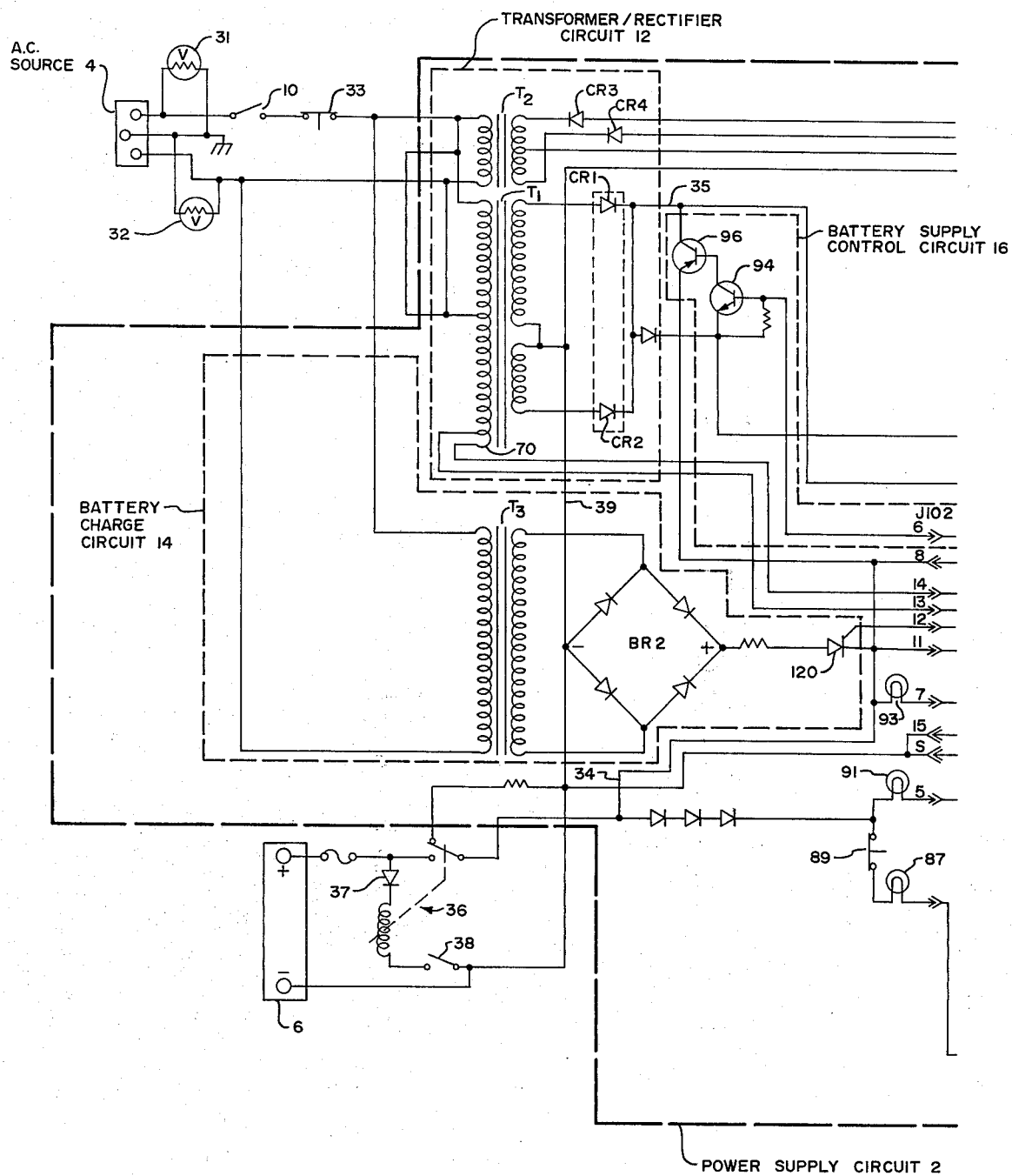
Figure 2:
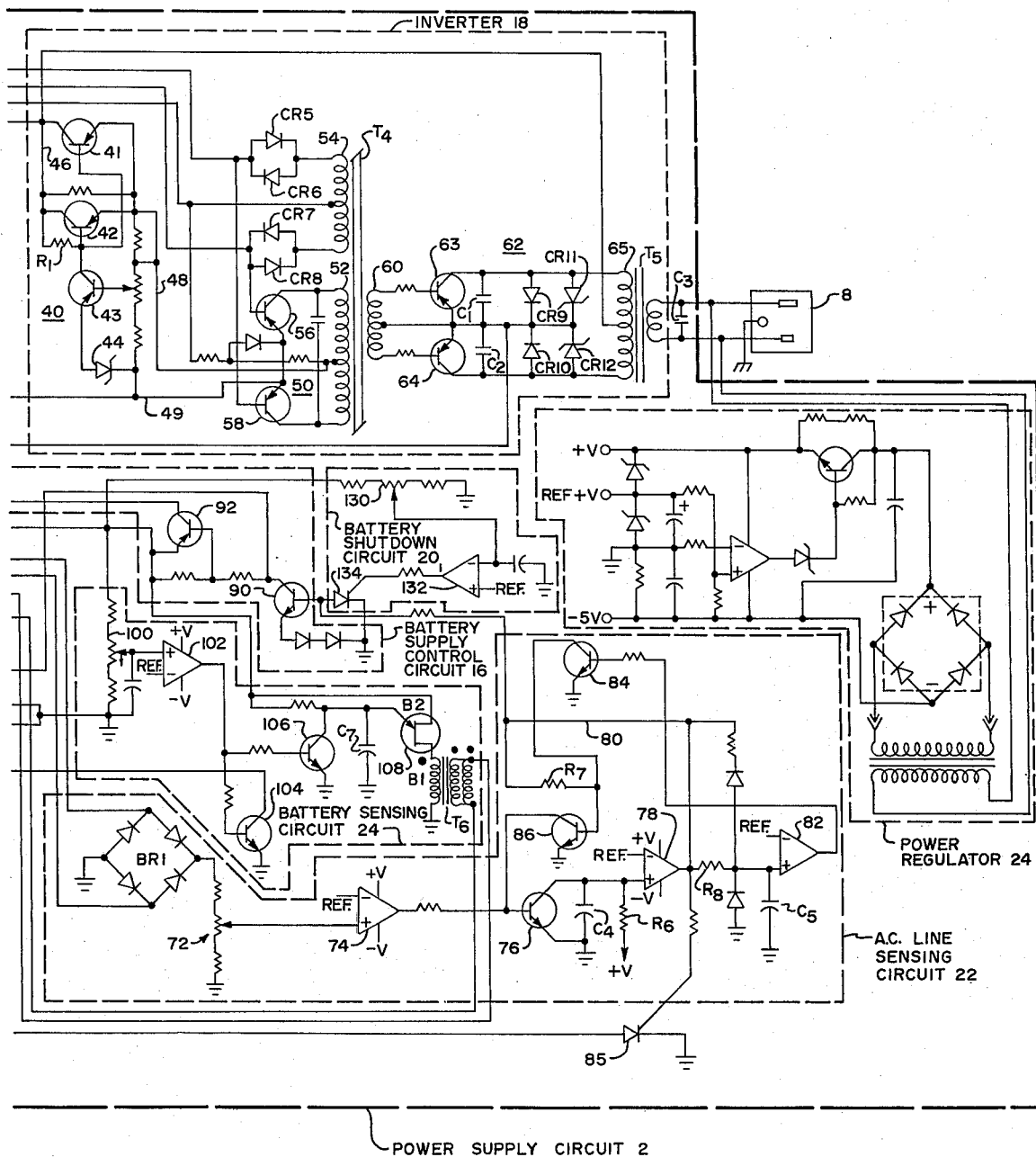

The power supply system 2 of composite FIGS. 1 and 2 operates in conjunction with an A.C. source 4 and D.C. source or battery 6 to provide a continuous A.C. output at terminal 8. When the A.C. source 4 supplies what is considered "full power" to the power supply system 2, then the system 2 draws no power from the battery 6, but rather supplies a charging current to the battery. When the A.C. source 4 drops below a predetermined level, then the power supply system 2 draws so much power from the battery 6 as is needed to supplement the power received from the A.C. source 4 so that the level of the A.C. output at terminal 8 can be maintained. The power supply system 2 consists of a number of component subcircuits which first will be generally described and then will be described in detail.

When switch 10 is closed, power from the A.C. source 4 is supplied to a transformer/rectifier circuit 12 and also to a battery charge circuit 14. The transformer/rectifier circuit 12 rectifies the current from the A.C. source 4 and applies the rectified current to a so-called inverter 18. If the amplitude of the current supplied to the transformer/rectifier circuit 12 is less than some predetermined level, an A.C. line sensing circuit 22 senses this and applies a control signal to a battery supply control circuit 16 to cause the battery supply control circuit to connect the battery 6 to the output of the transformer/rectifier circuit 12. Then, both the A.C. source 4 and the battery 6 contribute to the current supplied to the inverter 18. If the amplitude of the current supplied to the transformer/rectifier circuit 12 is above the predetermined level, then the A.C. line sensing circuit 22 does not apply a control signal to the battery supply control circuit 12 so that the battery 6 is not connected to the output of the transformer/rectifier circuit 12.

The inverter 18 is adapted to supply an A.C. output from either an A.C. input, a D.C. input, or a mixture of the two. When supplying the A.C. output primarily from the A.C. source 4, the output is synchronized with the signal produced by the A.C. source 4.

A battery sensing circuit 24 monitors the output of the battery 6 and, when the output of the battery falls below a predetermined level, applies a charging control signal to the battery charge circuit 14. In response to this signal, the battery charge circuit 14 applies rectified current to the battery 6 to thereby charge the battery. When the battery 6 is at full charge, this is detected by the battery sensing circuit 24 so that no charging control signal is applied to the battery charge circuit 14 and no rectified current is supplied to the battery 6.

A battery shutdown circuit 20 also monitors the output of the battery 6 and when the output falls below some predetermined level, the battery shutdown circuit 20 prevents the A.C. line sensing circuit 22 from applying a control signal to the battery supply control circuit 16 to thus prevent the battery supply control circuit 16 from coupling the battery 6 to the output of the transformer/rectifier circuit 12. The function of the battery shutdown circuit 20 is to prevent connection of the battery 6 to the power supply circuit 2 when the battery output is quite low, and thus prevent damage to the battery.

The A.C. source 4 is coupled to a pair of varistors 31 and 32 to protect against over voltage in the output of the source. The varistors are adapted to conduct to ground when the output of the A.C. source 4 exceeds a certain level. A test switch 33 is provided to enable the power supply system user to test whether or not the system is properly operating. When the test switch 33 is operated to open the connection between the A.C. source 4 and the power supply system 2, loss of power from the source is simulated so that if the power supply system 2 is properly operating, the battery 6 will be connected to supply the necessary power.

A relay 36 is provided in the output of the battery 6 as a safety feature to assure that the battery is properly connected. Thus, if the battery 6 is connected in reverse, current will not flow via a diode 37 to the coil of the relay 36 and the relay will not be operated to connect the battery 6 to the power supply system 2. A manually operable switch 38 is also provided in the output of the battery 6 to either allow or prevent operation of the relay 36. When the switch 38 is closed, the relay 36 can be operated and when the switch 38 is open, the relay 36 cannot operate.

As indicated earlier, the A.C. source 4 is coupled to the transformer/rectifier circuit 12 which includes a pair of transformers T1 and T2. Primary coils of each of the transformers T1 and T2 are coupled to the A.C. source 4. The secondary coil of transformer T1 is coupled to a pair of diodes CR1 and CR2 to form a full-wave rectifier whose output is supplied to the inverter 18. The secondary coil of transformer T2 similarly is coupled to a pair of diodes CR3 and CR4 to form a rectifier whose output is also supplied to the inverter 18.

The inverter 18 includes voltage regulator circuitry 40 for limiting the voltage and oscillator/driver circuitry 50. The regulator 40 includes a number of transistors 41, 42 and 43 and a zener diode 44. Under normal voltage levels, transistors 41 and 42 are biased on to conduct current from lead 46 to lead 48. When the voltage on lead 46 begins to exceed a certain predetermined level, transistor 43 is biased on to also conduct current from lead 46 via resistor R1 and zener diode 44 to return lead 49. This prevents the voltage on lead 46 from exceeding the predetermined level and the current supplied via the voltage regulator 40 to the oscillator/driver 50 is limited to a certain level.

The oscillator/driver 50 of the inverter 18 includes an amplifier composed of transistors 56 and 58 coupled to a primary winding 52 of a transformer T4. A secondary winding 54 of the transformer T4 comprises a part of a feedback path to the transistors 56 and 58. Another secondary winding 60 of the transformer T4 is coupled to power switching circuitry 62 which, in turn, is coupled by way of a transformer T5 to the output terminal 8. Each end of the secondary winding 54 of the transformer T4 is coupled by a pair of diodes, oppositely directed and connected in parallel (CR5 through CR8), to the base electrodes of the transistors 56 and 58. The full-wave rectifier composed of the transformer T2 and the diodes CR3 and CR4 is also connected to the base electrodes of the transistors 56 and 58. The operation of the inverter 18 when receiving full power from the A.C. source 4 will now be described.

Rectified current from the transformer/rectifier circuit 12 flows from the center tap of the secondary winding of the transformer T1 through the voltage regulator 40 of the inverter 18 to the center tap of the winding 52 of the transformer T4. From there, the current flows through resistors R3 and R2 to the center tap of the winding 54 of the transformer T4, through both the upper and lower legs of the winding 54 and through diodes CR5 and CR8 to the base electrodes of the transistors 58 and 56 respectively. Current is also caused to flow from the secondary winding of the transformer T2 through one of the diodes CR3 or CR4 (depending upon whether the positive or negative half cycle is being produced by the A.C. source 4) to one of the base electrodes of the transistors 56 or 58. Assume that current is caused to flow through the diode CR4 to the base electrode of the transistor 56. In such case, the transistor 56 is caused to turn on much more than transistor 58 thereby creating a voltage drop between the center tap of the winding 52 of the transformer T4 and the collector electrode of the transistor 56 connected to the top end of the winding 52. With such voltage drop, of course, current is caused to flow from the center tap of the winding 52 through the upper leg thereof and through the transistor 56 to the return lead 49. The current flow through the upper leg of the winding 52 produces a magnetic field in the transformer T4 and thereby induces a voltage drop across the winding 54 so as to cause a current flow from the center tap of the winding 54 through the lower leg thereof and through the diode CR8 to the base electrode of the transistor 56. This, in turn, causes the transistor 56 to turn on further to induce still more current flow in the winding 52 of transformer T4, etc.

When the core of the transformer T4 reaches saturation, less current flows through the bottom leg of the winding 54 and so less current is supplied to the transistor 56 causing the transistor to begin to turn off. As the magnetic field which had been induced in the transformer T4 begins to collapse following saturation, current begins to flow in directions opposite to that described above so that transistor 56 is caused to turn off and transistor 58 is caused to turn on. At about this same time, current begins to flow from the secondary winding of the transformer T2 through the diode CR3 (since the A.C. source 4 is now producing a half cycle opposite in polarity to the previously produced half cycle) to the base electrode of the transistor 58. This causes the transistor 58 to turn on more rapidly and create a voltage drop between the center tap of the winding 52 and the collector electrode of the transistor 58 which is connected to the bottom end of the winding 52. This induces a current flow from the center tap of the winding 52 through the lower leg of the winding and through the transistor 58 to the return lead 49. Current is thus induced to flow from the center tap of the winding 54 of the transformer T4 through the upper leg of the winding and through the diode CR5 to the base electrode of the transistor 58 causing the transistor to turn on even more. The transistor 58 continues to turn on and conduct until the core of the transformer T4 reaches saturation and the next half cycle of the output of the A.C. source 4 begins.

In the manner described, an oscillatory output is produced by the oscillator/driver 50 of the inverter 18 when operating on full power from the A.C. source 4. As also described, the current supplied from the transformer T2 via the diode CR3 and CR4 to the oscillator/driver 50 operates to cause the oscillator/driver to operate in synchronization with the output of the A.C. source 4. That is, the current from the transformer T2 determines which of the transistors 56 or 58 will be turned on and thus which direction current will be induced to flow in the transformer T4. The diodes CR6 and CR7, not specifically mentioned in the above description, are provided to allow application of a positive going feedback signal to the base electrodes of the transistors 56 and 58 to insure their turnoff every other half cycle.

The oscillatory output of the oscillator/driver 50 produces an oscillatory current in the secondary winding 60 of the transformer T4 and this in turn alternately drives a first bank of transistors connected in parallel (represented by single transistor 63) and a second bank of transistors also connected in parallel (represented by single transistor 64). Alternately turning on the two banks of transistors causes current to flow alternately in the upper leg of the winding 65 of the transformer T5 and the lower leg of winding 65 to thereby produce an A.C. output signal which is applied to output terminal 8. The capacitors C1 and C2, diodes CR9 and CR10, and zener diodes CR11 and CR12 are provided for over-voltage protection. The capacitor C3 is similarly provided to filter out any sharp voltage spikes.

When the output of the A.C. source 4 drops below some predetermined level, as determined by the A.C. line sensing circuit 22, the battery supply control circuit 16 is signalled to connect the battery 6 to the output of the transformer/rectifier circuit 12. Detection of the output of the A.C. source 4 is accomplished by supplying a current signal from a secondary winding 70 of the transformer T1 to a full-wave diode bridge rectifier BR1 of the A.C. line sensing circuit 22. The magnitude of the signal supplied to the bridge rectifier BR1, of course, is proportional to the magnitude of the output of the A.C. source 4. The bridge rectifier BR1 rectifies the supplied current signal and applies it to a voltage divider network 72 which is coupled to the non-inverting input of a differential amplifier 74. When the output of the A.C. source 4 is above a predetermined level, the differential amplifier 74 is triggered by the signal applied to its non-inverting input to generate a positive-going output signal each half cycle of the A.C. source 4 output. The positive-going signals produced by the differential amplifier 74 successively trigger a transistor 76 into a conducting condition to successively "reset" a timing circuit composed of a capacitor C4, a resistor R6 and differential amplifier 78, i.e., to successively discharge the capacitor C4. The capacitor C4 is charged by a voltage source +V through the resistor R6. As long as the capacitor C4 is discharged every half cycle by the transistor 76, the differential amplifier 78 is not triggered and thus no control signal is applied via line 80 to the battery supply control circuit 16.

Assume now that the output of the A.C. source 4 is insufficient to cause triggering of the differential amplifier 74. In this case, the transistor 76 is not triggered so that the charge on the capacitor C4 is allowed to build up to a level where the differential amplifier 73 is triggered to generate a positive-going control signal which is applied via lead 80 to the battery supply control circuit 16. This control signal is applied to the base electrode of a transistor 90 causing the transistor to turn on and conduct and this, in turn, causes another transistor 92 to turn on. Turning on transistor 92 allows a current to be supplied via the transistor to the base electrode of a transistor 94 to turn on this transistor which, in turn, causes the turning on of a power transistor 96. With the power transistor 96 turned on, a circuit path is established between the battery 6, via lead 34 through the transistor 96 to the output lead 35 of the transformer/rectifier circuit 12. A current path is thus established between the battery 6 and the inverter 18 (the path being completed from the inverter back to the battery by lead 39) so that current may be supplied by the battery to the inverter.

Unless the output of the A.C. source 4 is zero, there will be some voltage on the output lead 35 of the transformer/rectifier circuit 12 and the magnitude of this voltage will determine the amount of current drawn from the battery 6. If the voltage on lead 35 is relatively high (even though the output of the A.C. source 4 is not of sufficient magnitude to supply the needed power to the inverter 18), very little current will be drawn from the battery 6 because of the small voltage drop between the battery 6 and lead 35. If the magnitude of the voltage on lead 35 is relatively low, then more current will be drawn from the battery. In this manner, once the circuit connection is established between the battery 6 and the output of the transformer/rectifier circuit 12 by turning on the power transistor 96, only so much current as is needed is drawn from the battery.

To prevent "disconnection" of the battery 6 from the output of the transformer/rectifier circuit 12 immediately after the connection has been established (for example because the low output of the A.C. source 4 persists only a very short time), a latch circuit arrangement is provided in the A.C. line sensing circuit 22. The latching circuitry includes a transistor 86 whose base electrode is coupled via a resistor R7 to the output of the differential amplifier 78. When the differential amplifier 78 produces the positive-going control signal, the transistor 86 is biased into a conducting condition so that any subsequent positive-going signals produced by the differential amplifier 74 will be conducted to ground to prevent the turning on of the transistor 76. If the transistor 76 is prevented from being turned on, then a charge will be maintained on the capacitor C4 so that the differential amplifier 73 will continue to generate the control signal.

Another timing circuit is also provided in the A.C. line sensing circuit 22 to, in effect, "delatch" the latching circuitry after a predetermined period of time. This timing circuitry includes a resistor R8, a capacitor C5, and another differential amplifier 82 coupled to the resistor R8 and the capacitor C5 and to a transistor 84. When the differential amplifier 78 commences to generate the positive-going control signal in response to a drop in the output level of the A.C. source 4, the capacitor C5 begins to charge from the control signal. After a certain predetermined period of time, depending upon the time constant of the resistor R8 and capacitor C5, the charge on the capacitor will reach a level sufficient to trigger the differential amplifier 82 and cause it to apply a positive signal to the base electrode of the transistor 84. This turns on the transistor 84 to thereby conduct to ground the control signal applied by the differential amplifier 78 to the lead 80. With the control signal from the differential amplifier 78 being conducted to ground, the transistor 86 cannot be maintained in the conducting condition so it is turned off to thereby allow application of any positive-going signals produced by the differential amplifier 74 to the base electrode of the transistor 76. The effect of this is to "delatch" the transistor 86 to allow turning on the transistor 76 to discharge the capacitor C4 and thereby cause the differential amplifier 78 to terminate generation of the control signal.

When the differential amplifier 78 generates the control signal indicating an interruption in the A.C. source 4, the control signal triggers a silicon-controlled rectifier 85 into a conducting condition to allow current to flow to and activate a lamp 87. The lamp is activated by current from the battery 6. In order to return the silicon-controlled rectifier 85 to a nonconducting condition following termination of production of the control signal by the differential amplifier 78, a switch 89 is provided to interrupt the current path from the battery 6 to the silicon-controlled rectifier.

Another lamp 93 is provided to indicate that battery current is being supplied to the inverter 18. When the differential amplifier 78 applies the control signal to the transistor 90 to turn the transistor on, a current path is provided for the lamp 93 so that the lamp is activated. This current path runs from the battery 6 through the lamp 93, through the transistor 90 and through a pair of diodes to ground.

When the battery output falls below a certain level, as described earlier, the battery sensing circuit 24 detects this condition and signals the battery charge circuit 14 to apply rectified A.C. to the battery. The battery sensing circuit 24 includes a voltage divider network 100 connected to the noninverting input of a differential amplifier 102. When the level of the voltage supplied by the battery 6 via the voltage divider network 100 to the differential amplifier 102 is above a certain predetermined level, the differential amplifier applies a positive signal to a transistor 106 to maintain the transistor in a conducting condition. With the transistor 106 turned on, a capacitor C7 is prevented from charging and thus a unijunction transistor 108 is not fired. When the voltage level of the battery 6 drops below the predetermined level, the differential amplifier 102 produces a negative signal causing the transistor 106 to turn off and allow the capacitor C7 to charge with current supplied from the battery. When the charge on the capacitor C7 reaches a certain level, the unijunction transistor 108 is caused to fire and supply current to a primary winding of a transformer T6. Current is thus induced to flow in the secondary winding of the transformer T6 and this current is supplied to the gate electrode of a silicon-controlled rectifier 120 of the battery charge circuit 14. The silicon-controlled rectifier 120 is thus triggered to conduct current from a full-wave diode bridge rectifier BR2 to lead 34 and to the battery 6. This rectified current, of course, is supplied from the A.C. source 4 to the transformer T3 and then to the full-wave bridge rectifier BR2. The current supplied through the silicon-controlled rectifier 120 functions to charge the battery 6.

A lamp 91 is provided to indicate when the battery 6 is at full charge. The lamp 91 is activated when the differential amplifier 102 is generating a positive signal indicating that the output voltage produced by the battery 6 is above the predetermined level. The positive signal produced by the differential amplifier 102 is supplied to a transistor 104 to turn on the transistor and provide a current path for the lamp 91. Current from the battery 6 is supplied to the lamp 91 and through the transistor 104 to ground to activate the lamp. When the voltage level of the battery 6 falls below the predetermined level so that the differential amplifier 102 is caused to produce a negative signal, the transistor 104 turns off interrupting the current path of the lamp 91 so that the lamp is extinguished.

The battery shutdown circuit 20 also monitors the output voltage of the battery 6 to determine when this voltage falls below a predetermined level at which current should not be drawn from the battery. The battery shutdown circuit 20 includes a voltage divider network 130 coupled to the battery and to a differential amplifier 132. The voltage divider network 130 is set so that when the voltage output of the battery falls below the desired predetermined level, the differential amplifier 132 is caused to produce a positive signal which is applied to a silicon-controlled rectifier 134 to trigger the silicon-controlled rectifier into a conducting condition. With the silicon-controlled rectifier 134 in a conducting condition, any control signal produced by the A.C. line sensing circuit 22 is conducted to ground through the silicon-controlled rectifier to prevent the control signal from triggering transistor 90 into a conducting condition. Of course, if transistor 90 is prevented from assuming a conducting condition, then transistor 92 is similarly prevented from assuming a conducting condition as is transistor 94 and transistor 96 and thus the battery supply control circuit 16 is prevented from connecting the battery 6 to the output of the transformer/rectifier circuit 12. By preventing current drain from the battery 6 when the voltage output of the battery falls below some predetermined level, damage to the battery is prevented.

The remaining circuitry shown in the drawing in FIG. 2 is the power regulator circuit 24 which supplies power for the electronics of the power supply system 2. This circuit may be any conventional circuitry suitable for providing the power needed by the electronics of the power supply system 2 and for this reason is not described in detail.

In the manner shown and described, the power supply system 2 produces an A.C. output utilizing the output of the A.C. source 4 and the output of the battery 6 to account for whatever deficiency arises in the A.C. source 4. Only so much current is drawn from the battery 6 as is needed to supplement the current received from the A.C. source 4 so as to avoid complete reliance on the battery 6 when the A.C. source 4 drops below some minimum accepted level. The power supply system 2 also provides for charging the battery 6 when the battery's voltage output drops below a first level and for preventing current from being drawn from tje battery when the battery's voltage output falls below a second lower predetermined level.

It is to be understood that the above-described arrangement is only illustrative of the application of the principles of the present invention. Numerous other modifications and alternative arrangements may be devised by those skilled in the art without departing from the spirit and scope of the invention and the appended claims are intended to cover such modifications and arrangements.

What is claimed is:

1. An A.C. power supply circuit in combination with an A.C. source and a D.C. source for producing an oscillatory output in response to signals either from the A.C. source, the D.C. source, or both, said power supply circuit comprising
   a first rectifier for rectifing the A.C. signal produced by the A.C. source,
   a control circuit responsive to a control signal for coupling the D.C. source to the output of said rectifier,
   an A.C. sensing circuit coupled to the A.C. source for applying a control signal to said control circuit if the amplitude of the signal produced by said A.C. source falls below a predetermined level, and
   an oscillator circuit coupled to the output of said rectifier for producing an oscillatory signal in response to the signal present on the output of said rectifier,
   whereby said power supply circuit produces a substantially continuous oscillatory signal by drawing power from the D.C. source to the extent the output on the A.C. source falls below said predetermined level.

2. A power supply circuit as in claim 1 further comprising a second rectifier coupled to said A.C. source for applying a rectified A.C. signal to said oscillator circuit to thereby cause said oscillator circuit to produce an oscillatory signal in synchronization with the signal produced by said A.C. source.

3. A power supply circuit as in claim 2 wherein said oscillator circuit comprises
   amplifier means coupled to the output of said first rectifier,
   output circuit means coupled to said amplifier means for producing an oscillatory signal, and
   feedback circuit means coupled to said output circuit for supplying a feedback signal from said output circuit to said amplifier means.

4. A power supply circuit as in claim 3
   wherein said second rectifier includes a pair of diodes each of which conducts during alternate half cycles of the signal produced by the A.C. source,
   wherein said amplifier means includes a pair of transistors whose emitter electrodes are coupled to the output of said first rectifier and whose base electrodes are each coupled to a different one of said diodes,
   wherein said output circuit means includes a first transformer, a first winding of which is coupled between the collector electrodes of said pair of transistors, and
   wherein said feedback circuit means includes a second winding of said transformer inductively coupled to said first winding, one end of said second winding being coupled to the base electrode of one of said transistors and the other end of said second winding being coupled to the base electrode of the other of said transistors.

5. A power supply circuit as in claim 4 wherein said oscillator circuit further comprises a first pair of diodes coupled in parallel and in opposite directions between one end of said second winding and the base electrode of one of said transistors, and a second pair of diodes coupled in parallel and in opposite directions between the other end of said second winding and the base electrode of the other of said transistors.

6. A power supply circuit as in claim 5
   wherein said first rectifier includes a second transformer, a first winding of which is coupled to said A.C. source, and a pair of diodes each coupled to different ends of a second winding of said second transformer, and
   wherein the power supply circuit further comprises a voltage regulator coupling a center tap of said second winding of said second transformer to a center tap of said first winding of said first transformer and to a center tap of said second winding of said first transformer.

7. A power supply circuit as in claim 2 wherein said control circuit comprises
   a power transistor whose emitter-collector circuit is coupled between said D.C. source and the output of said first rectifier, and
   means coupled to the base electrode of said power transistor and responsive to said control signal for biasing said power transistor into a conducting condition.

8. A power supply circuit as in claim 7 further comprising means for producing a visual indication when said biasing means biases said power transistor into a conducting condition.

9. A power supply circuit as in claim 2 wherein said A.C. sensing circuit comprises
   a third rectifier for rectifying the signal produced by said A.C. source,
   threshold detection means coupled to said third rectifier for producing an output signal each time the level of the rectified signal from the third rectifier exceeds a predetermined level, and
   first timing means coupled to said threshold detection means for generating said control signal if no output signal is received by the first timing from the threshold detection means within a predetermined period of time.

10. A power supply circuit as in claim 9 further comprising means for producing a visual indication if said control signal is generated.

11. A power supply circuit as in claim 9 wherein said A.C. sensing circuit further comprises a latching circuit responsive to said control signal for preventing reception by the first timing means of output signals produced by the threshold detection means.

12. A power supply circuit as in claim 11 wherein said A.C. sensing circuit further comprises a second timing means for producing a signal to disable said latching circuit a predetermined period of time after said control signal is generated.

13. A power supply circuit as in claim 12 wherein said first timing means comprises
   a capacitor chargeable by a voltage source,
   a first transistor whose base electrode is coupled to said threshold detection means and whose collector and emitter electrodes are coupled across said capacitor, said transistor being responsive to an output signal applied to the base electrode of the transistor from the threshold detection means for discharging the capacitor, and
   a differential amplifier responsive to the charge on said capacitor exceeding a predetermined level for generating said control signal.

14. A power supply circuit as in claim 13 wherein said latching circuit comprises a second transistor whose base electrode is coupled to the output of said differential amplifier and whose emitter-collector circuit couples the base electrode of said first transistor to ground, said second transistor being responsive to the generation of said control signal for conducting the output signals produced by said threshold detection means to ground.

15. A power supply circuit as in claim 14 wherein said second timing means comprises
 a second capacitor chargeable by the generation of said control signal,
 a second differential amplifier for producing an output signal when the charge on said second capacitor exceeds a predetermined level, and
 a third transistor whose base electrode is coupled to the output of said second differential amplifier and whose emitter-collector circuit couples the base electrode of said second transistor to ground, said third transistor being responsive to the output signal produced by the second differential amplifier for conducting to ground any control signal applied to the base electrode of said second transistor.

16. A power supply circuit as in claim 2 further comprising
 a D.C. sensing circuit coupled to said D.C. source for producing a charging control signal if the amplitude of the signal produced by said D.C. source falls below a predetermined level, and
 a charging circuit coupled between said A.C. source and said D.C. source and responsive to said charging control signal for applying a rectified A.C. signal to said D.C. source.

17. A power supply circuit as in claim 16 wherein said D.C. sensing circuit comprises
 a differential amplifier for producing an output signal when the amplitude of the signal produced by said D.C. source falls below a predetermined level, and
 oscillatory means responsive to the output signal of the differential amplifier and to the signal produced by the D.C. source for producing an oscillatory charging control signal.

18. A power supply circuit as in claim 17 further comprising means for producing a visual indication when said differential amplifier is producing no output signal.

19. A power supply circuit as in claim 17 wherein said oscillatory means includes
 a unijunction transistor whose base 2 electrode is coupled to said D.C. source,
 a capacitor coupled to the emitter electrode of said unijunction transistor,
 a resistor coupling said capacitor to said D.C. source,
 a second transistor whose emitter-collector circuit couples the emitter of said unijunction transistor to ground, and whose base electrode is coupled to the output of said differential amplifier, said second transistor being responsive to the absence of an output signal from said differential amplifier for preventing the charging of said capacitor and being responsive to an output signal from said differential amplifier for enabling the charging of said capacitor and a corresponding firing of said unijunction transistor, and
 a transformer, one of whose windings is coupled to the base 1 electrode of said unijunction transistor and another of whose windings is coupled to said charging circuit, said one winding inducing current flow in said another winding each time said unijunction transistor fires.

20. A power supply circuit as in claim 16 wherein said charging circuit comprises
 a transformer, one winding of which is coupled to said A.C. source,
 a full-wave bridge rectifier coupled by a first pair of diagonal nodes across the other winding of said transformer, one node of a second pair of diagonal nodes of the bridge rectifier being coupled to said D.C. source, and
 a silicon-controlled rectifier whose anode-cathode circuit couples the other node of said second pair of diagonal nodes to said D.C. source and whose gate electrode is coupled to said D.C. sensing circuit for receiving said charging control signal to thereby cause said silicon-controlled rectifier to assume a conducting condition.

21. A power supply circuit as in claim 2 further comprising a D.C. source shutdown circuit for preventing application of said control signal to said control circuit if the amplitude of the signal produced by said D.C. source falls below a predetermined level.

22. A power supply circuit as in claim 21 wherein said shutdown circuit comprises
 threshold detection means for producing an output signal if the signal produced by said D.C. source falls below a predetermined level, and
 means coupled to said A.C. sensing circuit and responsive to the output signal from the threshold detection means for conducting to ground any control signal produced by the sensing circuit.

* * * * *